United States Patent
Jang et al.

(10) Patent No.: US 10,545,562 B2
(45) Date of Patent: Jan. 28, 2020

(54) ELECTRONIC DEVICE AND METHOD FOR OPERATING THE SAME

(71) Applicant: SAMSUNG ELECTRONICS CO., LTD., Suwon-si, Gyeonggi-do (KR)

(72) Inventors: Kyoungdon Jang, Incheon (KR); Dohyoung Kim, Suwon-si (KR); Hyunjin Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 78 days.

(21) Appl. No.: 15/492,311

(22) Filed: Apr. 20, 2017

(65) Prior Publication Data

US 2018/0011526 A1    Jan. 11, 2018

(30) Foreign Application Priority Data

Jul. 5, 2016    (KR) .................. 10-2016-0084727

(51) Int. Cl.
| | | |
|---|---|---|
| *G06F 1/00* | (2006.01) | |
| *G06F 1/26* | (2006.01) | |
| *G06F 1/32* | (2019.01) | |
| *G06F 1/3234* | (2019.01) | |

(52) U.S. Cl.
CPC .............. *G06F 1/3234* (2013.01); *G06F 1/26* (2013.01)

(58) Field of Classification Search
CPC ..................................... G06F 1/26; G06F 1/32
See application file for complete search history.

(56) References Cited

U.S. PATENT DOCUMENTS

| | | | |
|---|---|---|---|
| 2002/0087614 A1 | 7/2002 | Kocev et al. | |
| 2006/0143511 A1* | 6/2006 | Huemiller, Jr. | ......... G06F 9/526 714/12 |
| 2009/0089566 A1 | 4/2009 | Natu et al. | |
| 2009/0235260 A1* | 9/2009 | Branover | .............. G06F 1/3203 718/102 |
| 2009/0309243 A1* | 12/2009 | Carmack | ................. G06F 1/206 257/798 |
| 2012/0210104 A1* | 8/2012 | Danko | ................ G06F 9/30076 712/229 |
| 2013/0047011 A1* | 2/2013 | Dice | ........................ G06F 9/485 713/320 |
| 2013/0290758 A1* | 10/2013 | Quick | ................... G06F 1/3203 713/323 |
| 2014/0082387 A1* | 3/2014 | Wei | ....................... G06F 1/3287 713/322 |
| 2014/0095896 A1* | 4/2014 | Carter | ...................... G06F 1/26 713/300 |
| 2017/0039094 A1* | 2/2017 | Dice | ...................... G06F 9/526 |

* cited by examiner

*Primary Examiner* — Phil K Nguyen
(74) *Attorney, Agent, or Firm* — Nixon & Vanderhye P.C.

(57) ABSTRACT

An electronic device capable of placing restrictions on processor usage is disclosed. The electronic device may include: a memory; and a processor including a first core and a second core. The memory may store instructions that, when executed by the processor, cause the first core to transition from an active state to an idle state in response to a restriction signal for the first core, and cause the first core to transition to a power save state when the first core remains in the idle state for at least a preset time. For hot-unplugging, as the electronic device does not transition a core to an offline state, it does not have to perform cleanup operation on the memory and variables. Hence, it is possible to reduce the latency time due to hot-unplugging.

17 Claims, 11 Drawing Sheets

FIG. 7
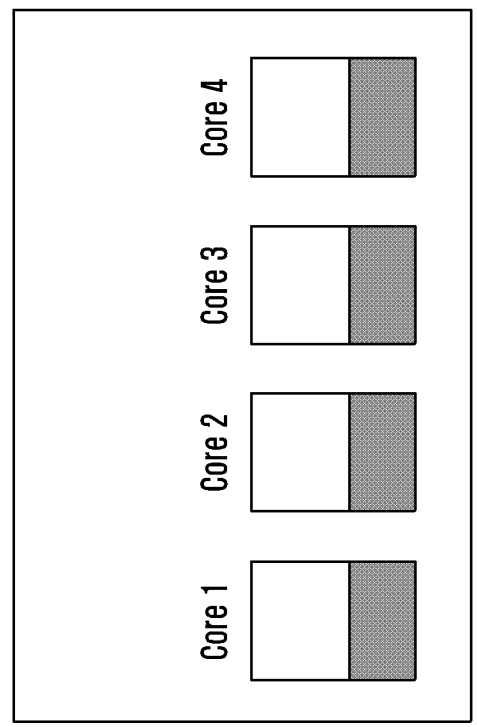
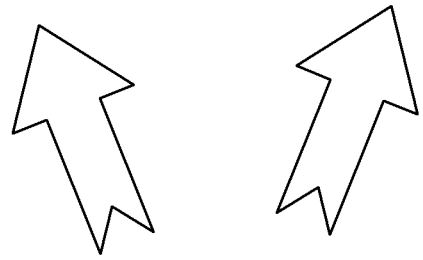
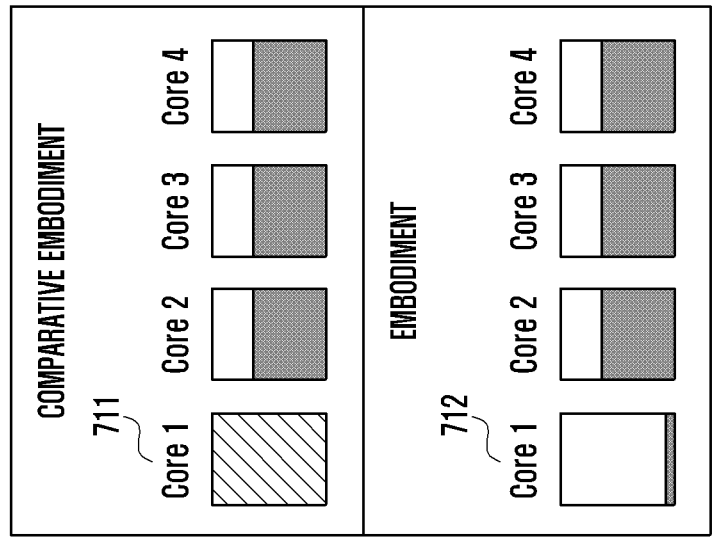

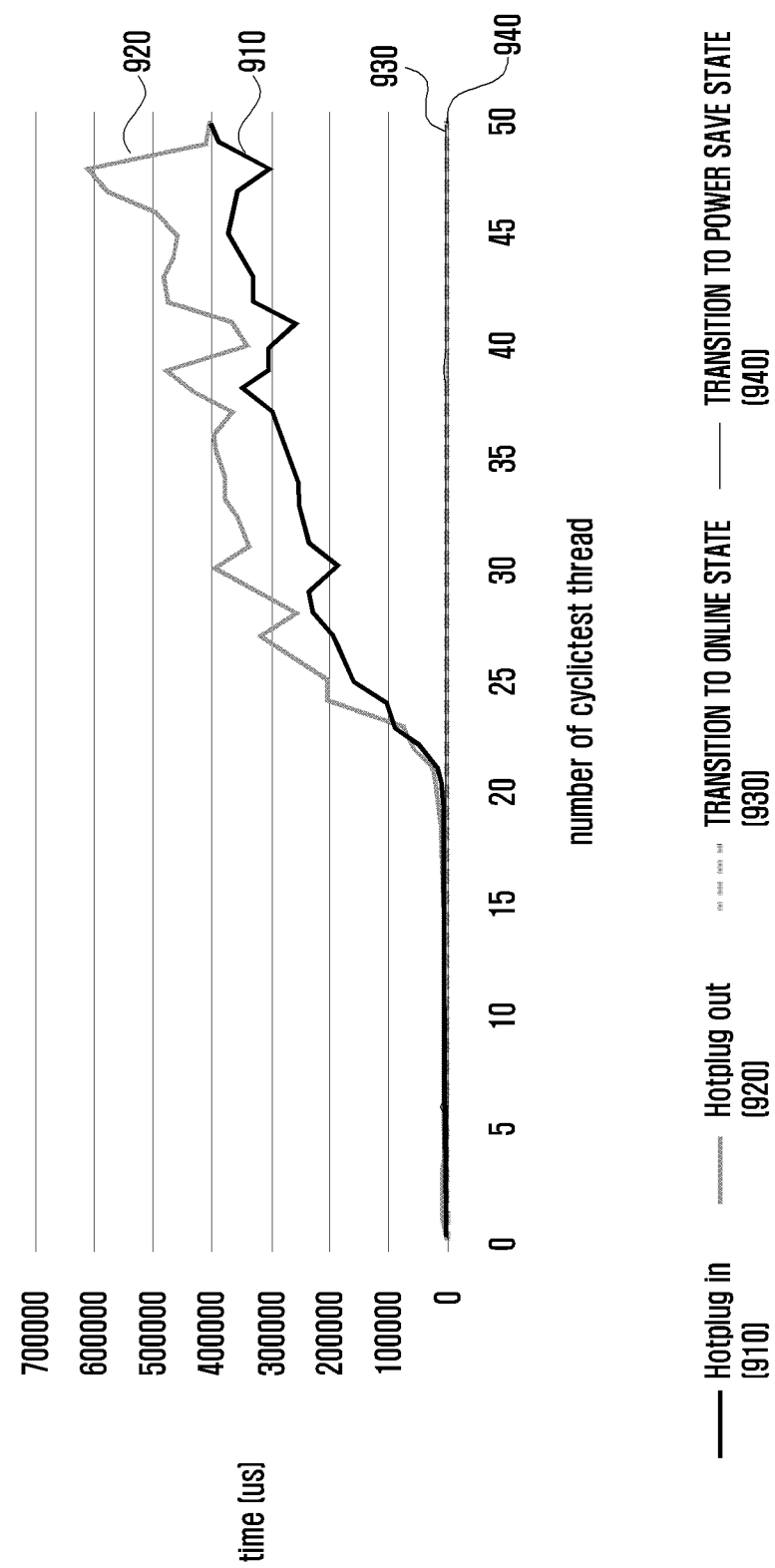

ELECTRONIC DEVICE AND METHOD FOR OPERATING THE SAME

CROSS-REFERENCE TO RELATED APPLICATION

This application is based on and claims priority under 35 U.S.C. § 119 to Korean Patent Application No. 10-2016-0084727 filed on Jul. 5, 2016 in the Korean Intellectual Property Office, the content of which is incorporated by reference herein in its entirety.

TECHNICAL FIELD

The present disclosure relates generally to an electronic device and a method for operating the same. For example, the present disclosure relates to a technique to place and lift restrictions on the usage of the processor.

BACKGROUND

Various types of processors have been developed to support various electronic devices such as smartphones, tablet personal computers, portable multimedia players, personal digital assistants, and laptop personal computers.

In recent years, techniques to reduce power consumed by processors have been developed as part of efforts to reduce power consumed by electronic devices.

In general, reducing power consumed by a processor may be achieved by changing the operating frequency of the processor or by suspending or restricting the usage of the processor.

Dynamic Voltage and Frequency Scaling (DVFS) is a representative technique for changing the operating frequency of a processor. When the workload is high, the operating frequency of the processor is increased; and when the workload is low, the operating frequency of the processor is decreased to reduce power consumption.

Hot plugging is a representative technique for suspending or restricting the usage of a processor. When the workload is low, a core may be transitioned to an offline state (hot-plugged off), reducing the number of available cores. When the workload is high, a core may be transitioned to an online state (hot-plugged in), increasing the number of available cores.

Transitioning a core to an offline state may entail process cleanup, interrupt masking, and timer event cleanup, thereby resulting in a time delay.

The technique for suspending or restricting the usage of a processor, which requires a relatively long delay to transition a core to an offline state, is less frequently used than the technique for changing the operating frequency of a processor.

SUMMARY

Example aspects of the present disclosure address at least the above mentioned problems and/or disadvantages and provide at least the advantages described below. Accordingly, an example aspect of the present disclosure provides an electronic device and a method for operating the same that support a technique for placing restrictions on the usage of the processor while reducing the latency time required for hot-plugging/unplugging.

In accordance with an example aspect of the present disclosure, an electronic device capable of placing restrictions on processor usage is provided. The electronic device may include: a memory; and a processor including a first core and a second core. The memory may store instructions that when executed by the processor cause the first core to transition from an online state to an idle state in response to a restriction signal for the first core, and cause the first core to transition to a power save state when the first core remains in the idle state for a preset time.

In accordance with another example aspect of the present disclosure, a method of operating an electronic device capable of placing restrictions on the usage of a processor including a first core and a second core is provided. The method may include: causing the first core to transition from an online state to an idle state in response to a restriction signal for the first core; and causing the first core to transition to a power save state when the first core remains in the idle state for a preset time.

In a feature of the present disclosure, the proposed operation method enables the electronic device to perform hot-unplugging not by transitioning a core to an offline state but by transitioning the core to a power save state using the ACPI specification. Hence, it is possible to reduce power consumption to a level comparable to that of the offline state.

In addition, to restrict the usage of the processor, as the electronic device does not transition a core to an offline state, it does not have to perform cleanup operation on the memory and variables. Hence, it is possible to reduce the latency time due to hot-unplugging.

BRIEF DESCRIPTION OF THE DRAWINGS

The above aspects, features and attendant advantages of the present disclosure will be more readily apparent and appreciated from the following detailed description, taken in conjunction with the accompanying drawings, in which like reference numerals refer to like elements, and wherein:

FIG. 7 is a diagram illustrating example cores with workloads for hot-unplugging operation in the electronic device according to an example embodiment of the present disclosure;

FIG. 9 is a graph illustrating an example result of comparison in terms of latency time between a comparative embodiment using hot-plugging/unplugging and an example embodiment using the method of the present disclosure.

DETAILED DESCRIPTION

Figure 1:
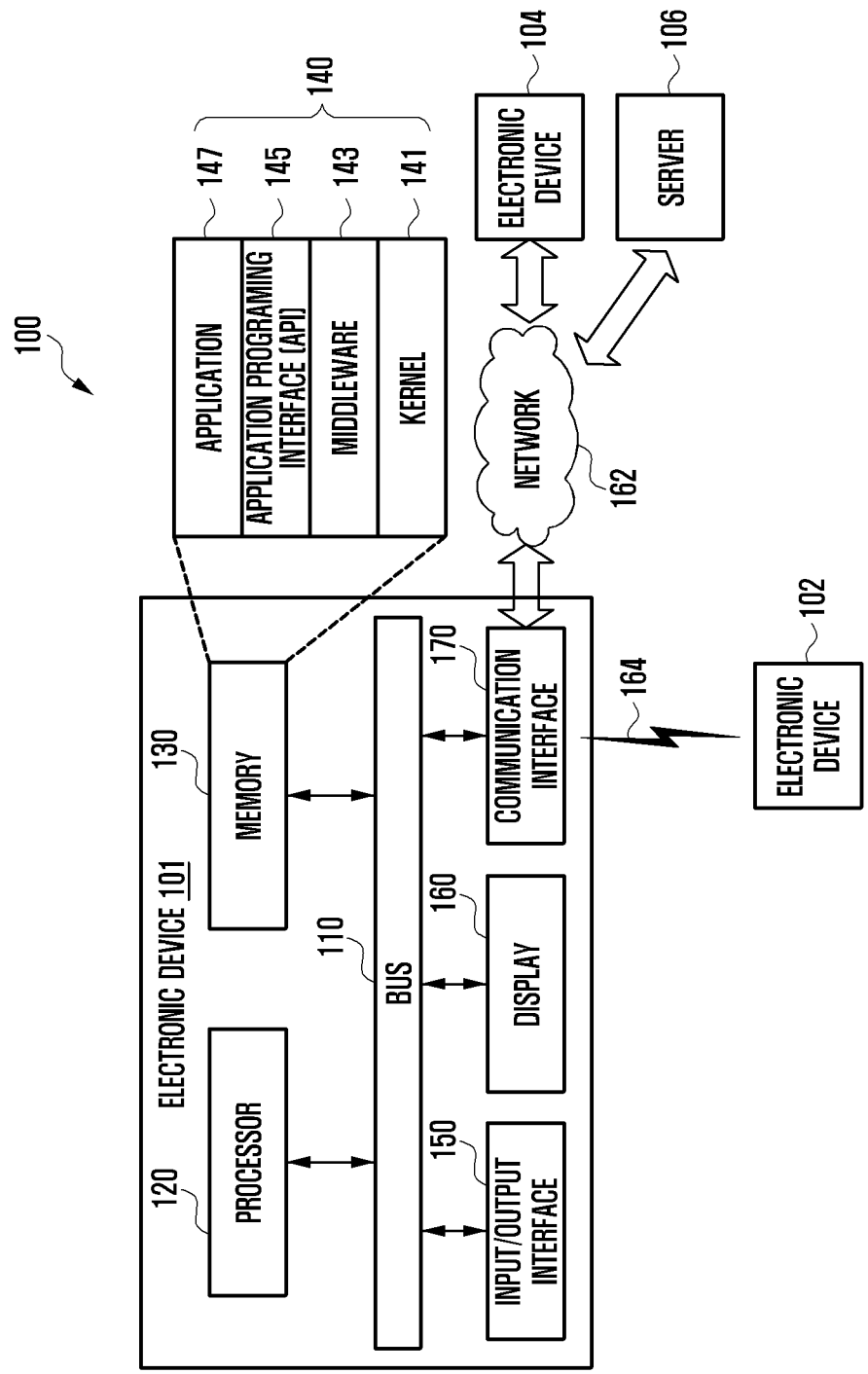
FIG. 1 is a diagram illustrating an example network environment including electronic devices according to various example embodiments of the present disclosure.

The following description is made with reference to the accompanying drawings and is provided to assist in a comprehensive understanding of various example embodiments of the present disclosure as defined by the claims and their equivalents. It includes various specific details to assist in that understanding but these are to be regarded as merely examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, may simply be used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" may generally denote that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in the present disclosure may refer, for example, to the presence of the disclosed functions, operations, and constituent elements and do not limit one or more additional functions, operations, and elements. In an example embodiment of the present disclosure, the terms, such as "include" and/or "have" may be understood to refer, for example, to a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In an example embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween.

An electronic device according to the present disclosure may be a device including a communication function. For example, and without limitation, the device may correspond to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, and the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, or the like. It will be apparent to those skilled in the art that the electronic device according to the present disclosure is not limited to the aforementioned devices.

According to various example embodiments of the present disclosure, cores included in the processor of the electronic device may be in one of various states. In the method for operating the electronic device, when a core is in the online state, power is normally applied to the core and the core is able to normally execute a process.

In the method for operating the electronic device, when a core is in the idle state, power is applied to the core but the core does not execute a process.

In the method for operating the electronic device, when a core is in the power save state, power whose level is lower than that of power applied in the online state is applied to the core and the core does not execute a process.

In the method for operating the electronic device, when a core is in the offline state, power is not applied to the core and the cache associated with the core is emptied of stored data. Hence, when a core is in the offline state, the core is unable to execute a process.

In the method for operating the electronic device, when the processor includes a first core and a second core, hot-unplugging (hot-plug out) may refer to transitioning the first core from the online state to the offline state. When the processor includes a first core and a second core, hot-plugging (hot-plug in) may refer to transitioning the first core from the offline state to the online state.

In the method for operating the electronic device, a restriction signal may refer to a command signal causing a core to transition into the power save state so as to place restrictions on the usage of the processor.

In the method for operating the electronic device, a restriction lift signal may refer to a command signal for lifting restrictions on the usage of the processor. That is, the restriction lift signal may cause a core to transition into the online state.

FIG. 1 is a block diagram illustrating example electronic devices in a network environment 100 according to various example embodiments of the present disclosure.

Referring to FIG. 1, an electronic device 101 may include a bus 110, a processor (e.g., including processing circuitry) 120, a memory 130, an input/output interface (e.g., including interface circuitry) 150, a display 160, a communication interface (e.g., including communication circuitry) 170, and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input/output interface 150, the display 160, the communication 170, and the like) through the bus 110, may interpret the received commands, and may execute calculation or data processing according to the interpreted commands. Although illustrated as one element, the processor 120 may include multiple processors without departing from the teachings herein.

The memory 130 may store commands or data received from the processor 120 or other elements (e.g., the input/output interface 150, the display 160, the communication interface 170, and the like) or generated by the processor 120 or the other elements. The memory 130 may include programming modules 140, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 100 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from one or more applications 140 and/or the middleware 143, for example, may perform load balancing of the work requests by using a method of assigning a priority, in which system resources (e.g., the bus 110, the processor 120, the memory 130, and the like) of the electronic device 100 can be used, to at least one of the one or more applications 140.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various interface circuitry and, for example, may receive a command or data as input from a user, and may deliver the received command or data to the processor 120 or the memory 130 through the bus 110. The display 160 may display a video, an image, data, and the like, to the user.

The communication interface 170 may include various communication circuitry and connect communication between electronic devices 102 and 104 and the electronic device 100. The communication interface 170 may support a short-range communication protocol 164 (e.g., Wi-Fi, Bluetooth (BT), and near field communication (NFC)), or a network communication 162 (e.g., the internet, a local area network (LAN), a wide area network (WAN), a telecommunication network, a cellular network, a satellite network, a plain old telephone service (POTS), and the like). Each of the electronic devices 102 and 104 may be a device which is identical (e.g., of an identical type) to or different (e.g., of a different type) from the electronic device 100. Further, the communication interface 170 may connect communication between a server 106 and the electronic device 100 via the network 162.

Figure 2:
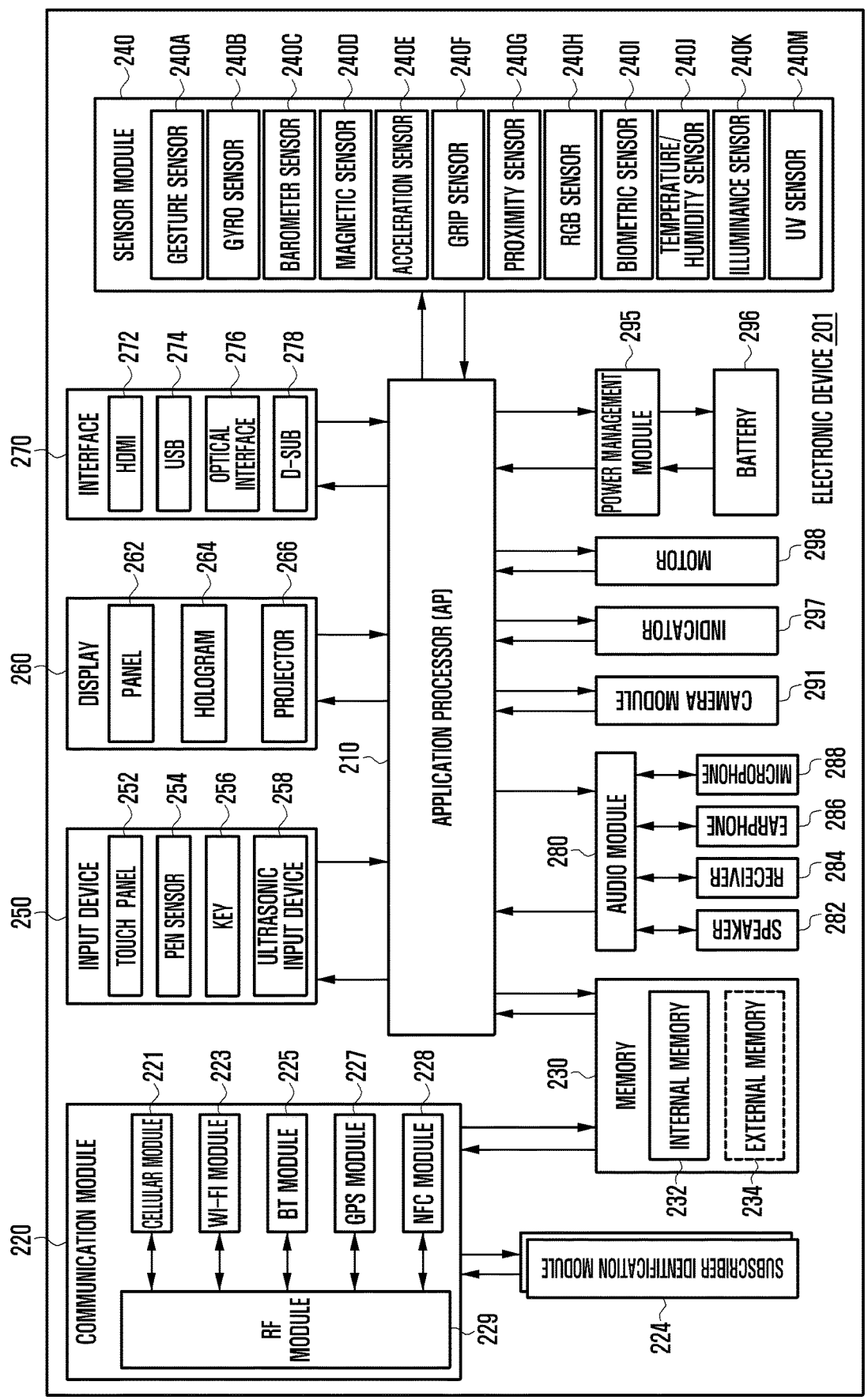
FIG. 2 is a block diagram illustrating an example electronic device according to various example embodiments of the present disclosure.

FIG. 2 is a block diagram illustrating an example electronic device according to various example embodiments of the present disclosure.

Referring to FIG. 2, an electronic device 201 may be, for example, the electronic device 101 illustrated in FIG. 1.

Referring to FIG. 2, the electronic device 201 may include a processor (e.g., and application processor including processing circuitry) 210, a subscriber identification module (SIM) card 224, a memory 230, a communication module (e.g., including communication circuitry) 220, a sensor module 240, an input device (e.g., including input circuitry) 250, a display 260, an interface (e.g., including interface circuitry) 270, an audio module (coder/decoder (codec)) 280, a camera module 291, a power management module 295, a battery 296, an indicator 297, a motor 298 and any other similar and/or suitable components.

The processor 210 may include various processing circuitry, such as, for example, and without limitation, one or more of a dedicated processor, a CPU, application processors (APs) (not illustrated), or one or more communication processors (CPs) (not illustrated). The processor 210 may be, for example, the processor 120 illustrated in FIG. 1. The AP and the CP may be included in the processor 210 in FIG. 2, or may be included in different integrated circuit (IC) packages, respectively. According to an embodiment of the present disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present disclosure, the processor 210 may further include a graphical processing unit (GPU) (not illustrated).

The CP may manage a data line and may convert a communication protocol in the case of communication between the electronic device (e.g., the electronic device 100) including the electronic device 201 and different electronic devices connected to the electronic device through the network. The CP may be implemented by, for example, an SoC. According to an embodiment of the present disclosure, the CP may perform at least some of multimedia control functions. The CP, for example, may distinguish and authenticate a terminal in a communication network by using a SIM (e.g., the SIM card 224). In addition, the CP may provide the user with services, such as a voice telephony call, a video telephony call, a text message, packet data, and the like.

Further, the CP may control the transmission and reception of data by the communication module 220. In FIG. 2, the elements, such as the power management module 295, the memory 230, and the like are illustrated as elements separate from the processor 210. However, according to an embodiment of the present disclosure, the processor 210 may include at least some of the above-described elements (e.g., the power management module 295).

According to an example embodiment of the present disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM card 224 may be a card implementing a SIM, and may be inserted into a slot formed in a particular portion of the electronic device 201. The SIM card 224 may include unique identification information (e.g., IC card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous dynamic RAM (SDRAM), and the like), and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, and the like). According to an embodiment of the present disclosure, the internal memory 232 may be in the form of a solid state drive (SSD). The external memory 234 may further include a flash drive, for example, a compact flash (CF), a secure digital (SD), a micro-SD, a mini-SD, an extreme digital (xD), a memory stick, and the like.

The communication module 220 may include various communication circuitry including, for example, and without limitation, a radio frequency (RF) module 229. The communication module 220 may be, for example, the communication interface 170 illustrated in FIG. 1. The communication module 220 may further include various communication circuitry including, for example, and without limitation, wireless communication modules to enable wireless communication through the RF module 229. The wireless communication modules may include, for example, and without limitation, a cellular module 221, a Wi-Fi module 223, a BT module 225, a GPS module 227, and/or a NFC module 228. Additionally or alternatively, the wireless communication modules may further include a network interface (e.g., a LAN card), a modulator/demodulator (modem), and the like for connecting the electronic device 201 to a network (e.g., the internet, a LAN, a WAN, a telecommunication network, a cellular network, a satellite network, a POTS, and the like) (not illustrated).

The communication module 220 (e.g., the communication interface 170) may perform data communication with other electronic devices (e.g., the electronic devices 102 and 104, and the server 106) through a network (e.g., network 162).

The RF module 229 may be used for transmission and reception of data, for example, transmission and reception of RF signals or called electronic signals. Although not illustrated, the RF unit 229 may include, for example, a transceiver, a power amplifier module (PAM), a frequency filter, a low noise amplifier (LNA), and the like. In addition, the RF module 229 may further include a component for transmitting and receiving electromagnetic waves in a free space in a wireless communication, for example, a conductor, a conductive wire, and the like.

The sensor module 240 may include, for example, at least one of a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance (e.g., light) sensor 240K, and an ultra violet (UV) sensor 240M. The sensor module 240 may measure a physical quantity or may detect an operating state of the electronic device 201, and may convert the measured or detected information to an electrical signal. Additionally/alternatively, the sensor module 240 may include, for example, an electronic nose (E-nose) sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein. The sensor module 240 may also, or in the alternative, be controlled by the processor 210.

The input device 250 may include various input circuitry, such as, for example, and without limitation, a touch panel 252, a pen sensor 254 (e.g., a digital pen sensor), keys 256, and an ultrasonic input device 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. In addition, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input device 258 enables the terminal to detect a sound wave by using a microphone (e.g., a microphone 288) of the terminal through a pen generating an ultrasonic signal, and to identify data. The ultrasonic input device 258 is capable of wireless recognition. According to an embodiment of the present disclosure, the electronic device 201 may receive a user input from an external device (e.g., a network, a computer, or a server), which is connected to the electronic device 201, through the communication module 220.

The display 260 may include a panel 262, a hologram 264, and a projector 266. The display 260 may be, for example, the display 160 illustrated in FIG. 1. The panel 262 may be, for example, a liquid crystal display (LCD) and an active matrix organic light emitting diode (AM-OLED) display, or the like, but is not limited thereto. The panel 262 may be implemented so as to be, for example, flexible, transparent, or wearable. The panel 262 may include the touch panel 252 and one module. The hologram 264 may display a three-dimensional image in the air by using interference of light. The projector 266 may include light-projecting elements, such as LEDs, to project light into external surfaces. According to an embodiment of the present disclosure, the display 260 may further include a control circuit for controlling the panel 262, the hologram 264, or the projector 266.

The interface 270 may include various interface circuitry, such as, for example, and without limitation, a high-definition multimedia interface (HDMI) 272, a universal serial bus (USB) 274, an optical interface 276, and a d-subminiature (D-sub) 278. Additionally or alternatively, the interface 270 may include, for example, SD/multi-media card (MMC) (not illustrated) or infrared data association (IrDA) (not illustrated).

The audio module (codec) 280 may bidirectionally convert between a voice and an electrical signal. The audio module 280 may convert voice information, which is input to or output from the audio module 280, through, for example, a speaker 282, a receiver 284, an earphone 286, the microphone 288, and the like.

The camera module 291 may capture an image and a moving image. According to an embodiment of the present disclosure, the camera module 291 may include one or more image sensors (e.g., a front lens or a back lens), an image signal processor (ISP) (not illustrated), and a flash LED (not illustrated). The power management module 295 may manage power of the electronic device 201. Although not illustrated, the power management module 295 may include, for example, a power management IC (PMIC), a charger IC, or a battery fuel gauge.

The PMIC may be mounted to, for example, an IC or an SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, and the like) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the electronic device 201 or a part of the electronic device 201 (e.g., the AP), for example, a booting state, a message state, a charging state and the like. The motor 298 may convert an electrical signal into a mechanical vibration.

Although not illustrated, the electronic device 201 may include a processing unit (e.g., a GPU) for supporting a module TV. The processing unit for supporting a module TV may process media data according to standards, such as, for example, digital multimedia broadcasting (DMB), digital video broadcasting (DVB), media flow, and the like. Each of the above-described elements of the electronic device 201 according to an embodiment of the present disclosure may include one or more components, and the name of the relevant element may change depending on the type of electronic device. The electronic device 201 according to an embodiment of the present disclosure may include at least one of the above-described elements. Some of the above-described elements may be omitted from the electronic device 201, or electronic device 201 may further include additional elements. In addition, some of the elements of the electronic device 201 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," and the like. The "module" may be a minimum unit of a component formed as one body or a part thereof. The "module" may be a minimum unit for performing one or more functions or a part thereof. The "module" may be implemented mechanically or electronically. For example, the "module" according to an example embodiment of the present disclosure may include at least one of a dedicated processor, a CPU, an application-specific integrated circuit (ASIC) chip, a field-programmable gate array (FPGA), and a programmable-logic device for performing certain operations which have been known or are to be developed in the future.

Figure 3:
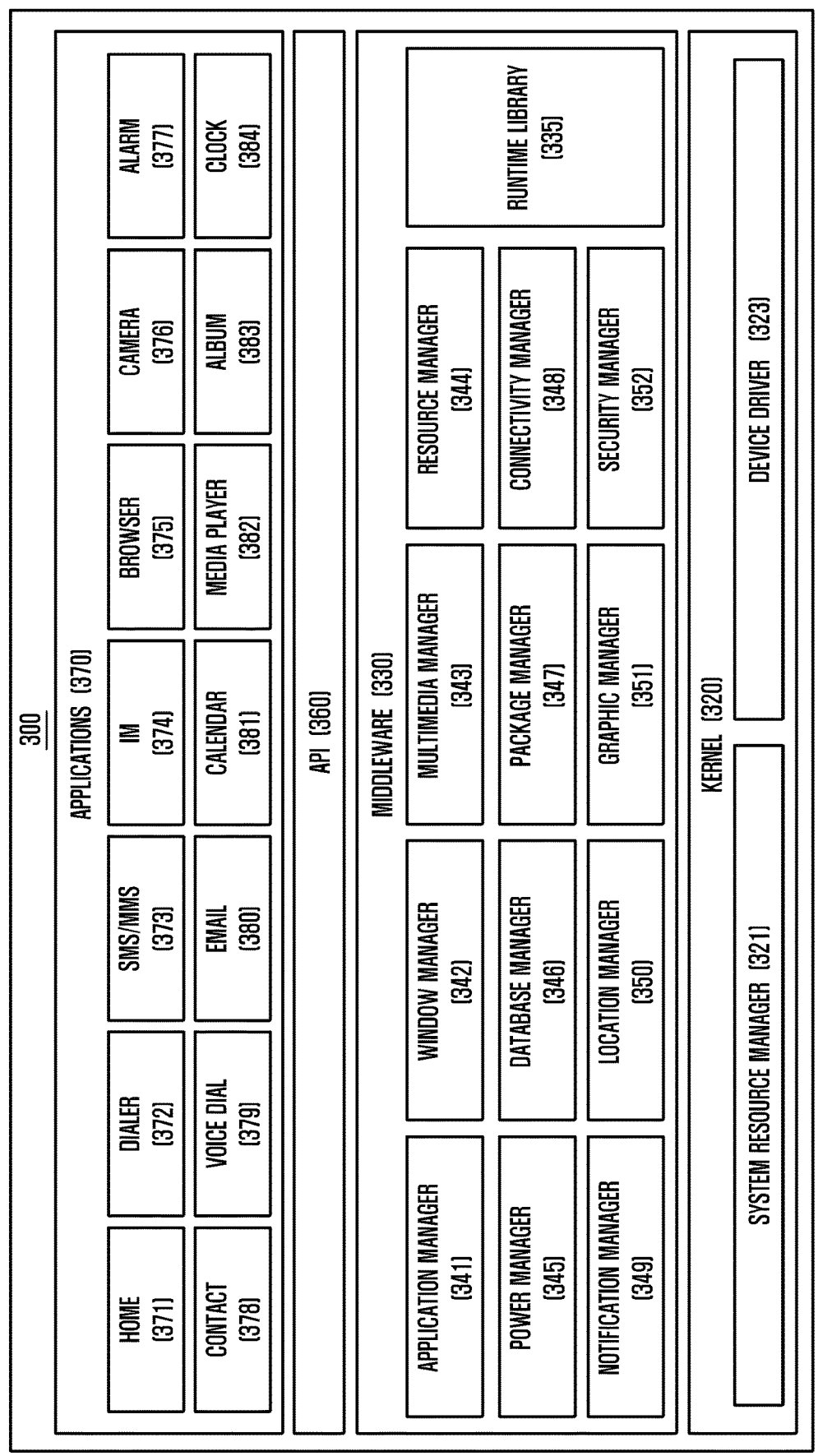
FIG. 3 is a block diagram illustrating an example program module according to various example embodiments of the present disclosure.

FIG. 3 is a block diagram illustrating an example configuration of a programming module according to an example embodiment of the present disclosure.

Referring to FIG. 3, a programming module 300 may be included (or stored) in the electronic device 100 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the electronic device 201), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). In addition, according to an embodiment of the present disclosure, the device driver 323 may include an inter-process communication (IPC) driver (not illustrated).

The middleware 330 may include multiple modules previously implemented so as to provide a function used in common by the applications 370. In addition, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity, such as, for example, Wi-Fi and BT. The notification manager 349 may display or report, to the user, an event, such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. In addition, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the processor 210), the one or more processors may perform functions corresponding to the instructions. The non-transitory computer-readable storage medium may be, for example, the memory 230. At least a part of the programming module 300 may be implemented (e.g., executed) by, for example, the processor 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. In addition, some of the operations may be omitted, or other operations may be added to the operations.

Figure 4:
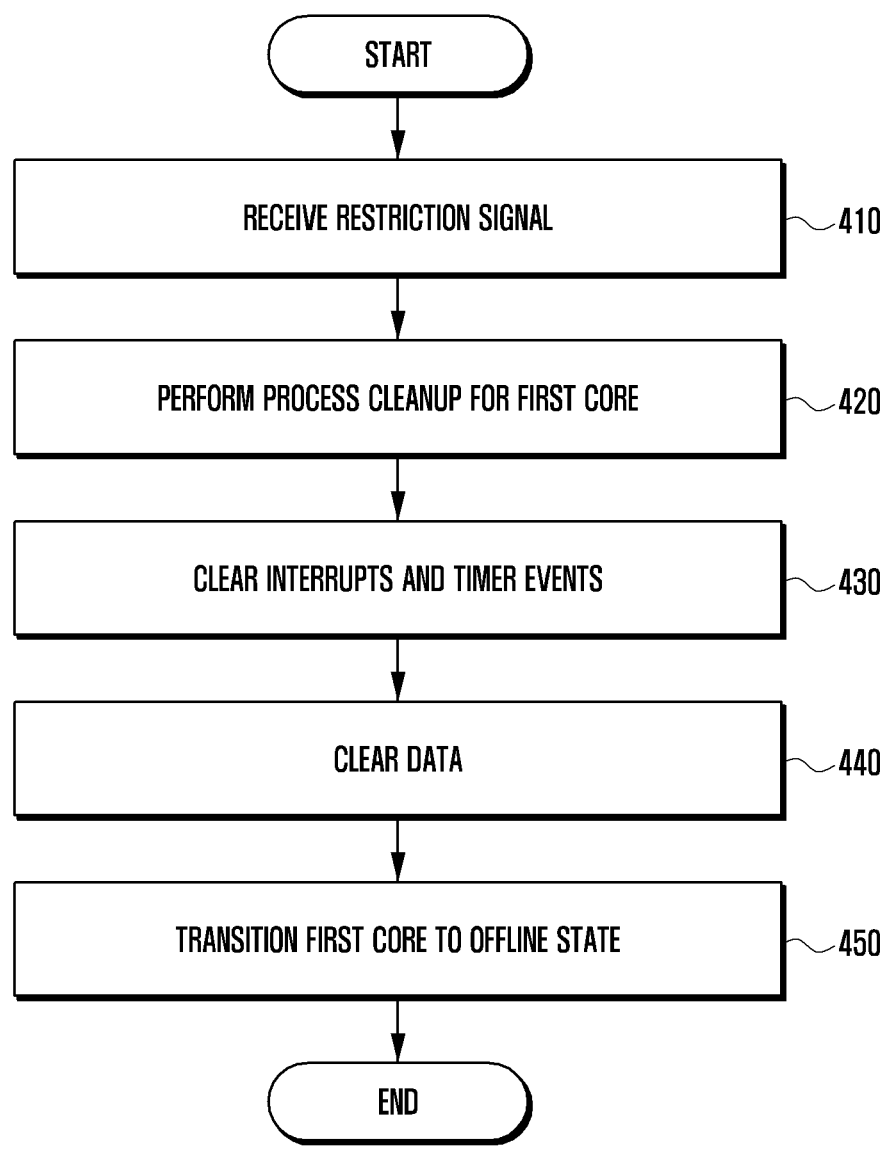
FIG. 4 is a flowchart illustrating an example procedure for hot-unplugging.

FIG. 4 is a flowchart illustrating an example procedure for hot-unplugging (hot-plug out).

Referring to FIG. 4, at step 410, the processor may receive a restriction signal. In response to the restriction signal, at step 420, the first core may perform process cleanup.

At step 430, the first core may clear interrupts and timer events. At step 440, the first core may clear the cache associated therewith of stored data.

Thereafter, at step 450, the first core may enter the offline state.

In the embodiment illustrated in FIG. 4, it may be necessary to clear variables stored for the first core and to cancel actions related to the first core.

Although not shown in FIG. 4, upon reception of a specific signal after hot-plug out operation, the electronic device may perform hot-plugging (hot-plug in).

Upon reception of a restriction lift signal for lifting restrictions on the usage of the processor, the second core may supply power to the timer of the first core, causing the first core to transition to the online state.

Figure 5:
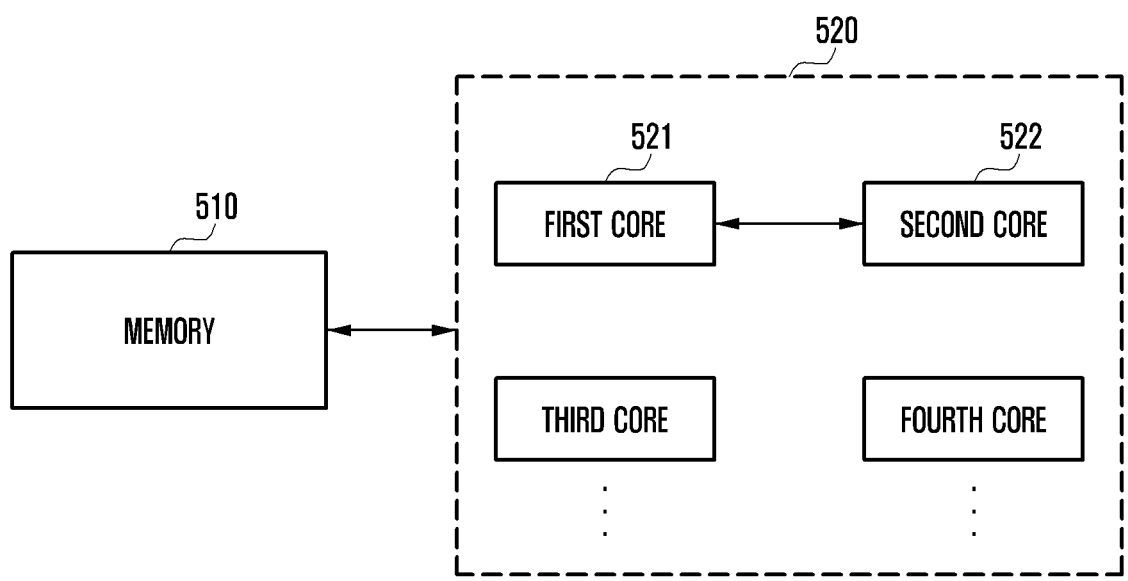
FIG. 5 is a block diagram illustrating an example electronic device according to an example embodiment of the present disclosure.

FIG. 5 is a block diagram illustrating an example electronic device according to an example embodiment of the present disclosure.

Referring to FIG. 5, the electronic device may include a memory 510, and a processor 520 including a first core 521 and a second core 522.

The memory 510 may store instructions for operations of the processor 520.

The processor 520 may control cores including the first core 521 according to the instructions stored in the memory 510.

When a restriction signal is received, the first core 521 may transition from the online state to the idle state.

A restriction signal for the first core 521 may be generated by an application running on the first core 521. A restriction signal for the first core 521 may also be generated in response to an idle-state request signal issued by the second core 522.

In an example embodiment, to place restrictions on the usage of the processor of the electronic device, the restriction signal may contain a command that causes the first core to transition to the idle state other than the offline state. This is described in greater detail below.

The first core 521 may perform one or more operations to remain in the idle state. Next, a description is given of operations performed by the first core 521 wishing to remain in the idle state.

The first core 521 may refrain from process allocation. To this end, the first core 521 or the second core 522 may change the affinity with a process so that the process is not assigned to the first core 521.

A process in the processor 520 may have an affinity with a specific core. Then, the process may be preferentially assigned to the specific core. For example, when the processor 520 includes four cores (first to fourth cores), it is possible to define an affinity for a process so that the process is preferentially assigned to the first core.

When an affinity is set for a process to be repeatedly executed, the process may continue its execution on the same core.

The first core 521 or the second core 522 may change the affinity of a process assigned to the first core 521 so that the process is not assigned to the first core 521.

The first core 521 may change the affinity of a process by use of the scheduler of the processor 520 capable of assigning processes to cores.

More specifically, the scheduler may change the affinity mask of a specific process to thereby adjust the affinity. The affinity mask may include a flag to control assignment of a process to the first core 521. The scheduler may change the flag of the affinity mask so that the corresponding process is not assigned to the first core 521.

That is, the first core 521 or second core 522 may change the process affinity to cause the first core 521 to enter the idle state.

Upon reception of a restriction signal, the first core 521 may block an interrupt request signal destined for the first core 521.

An interrupt may refer to a request signal issued by a peripheral unit or software element to notify the processor of a specific event requiring immediate handling. For example, an interrupt request signal destined for the first core 521 may cause the first core 521 to wait for assignment of another process. Hence, an interrupt request signal destined for the first core 521 may hinder the first core 521 from entering the idle state.

In an example embodiment, the first core 521 may block an interrupt request signal destined for itself so as to enter the idle state.

An interrupt request signal destined for the first core 521 may be an inter-processor interrupt (IPI) call sent by another core of the processor 520 to the first core 521. An interrupt request signal destined for the first core 521 may also be a symmetric multi-processors (SMP) call sent by another core of the processor 520 to all cores including the first core 521. An interrupt request signal destined for the first core 521 may be a signal sent by an API outside the processor 520.

The first core 521 may block an interrupt request signal destined for itself by use of a flag indicating interrupt acceptance. For example, the first core 521 may block reception of an IPI call by use of a flag indicating IPI call acceptance. The first core 521 may block reception of a SMP call by use of a flag indicating SMP call acceptance. The first core 521 may block reception of an IPI call and a SMP call by use of such flags.

The first core 521 may stop a timer inside the first core 521.

A core may have an associated timer. For the first core 521, upon expiration of a given time, the associated timer may activate the first core 521. To stop the timer associated with the first core 521, the processor 520 may activate the timer inhibition function (NO_HZ), permitting the first core 521 to remain in the idle state after expiration of a given time.

The above description may be related with operations performed by the first core 521 to remove a factor hindering the first core 521 from remaining in the idle state. In addition to the above operations, the first core 521 may perform the following operations to continuously remain in the idle state. The first core 521 may stop a kernel thread capable of thread generation and scheduling.

The first core 521 may stop the watchdog thread inside the first core 521. When the first core 521 is in a halt state, the watchdog thread may serve as a timer to allow the first core 521 to restart. That is, the watchdog thread may hinder the first core 521 from remaining in the idle state. Hence, to continuously remain in the idle state, the first core 521 may stop the watchdog thread.

To continuously remain in the idle state, the first core 521 may block task scheduling allocating resources to processes.

When the first core 521 remains in the idle state for a preset time, it may transition to the power save state. In this case, the first core 521 may apply clock gating to block supply of the clock signal to the first core 521. That is, to reduce power consumption, the first core 521 may block the clock signal destined for itself.

In addition, upon expiration of a given time after application of clock gating, the first core 521 may apply power gating to itself. The first core 521 may apply power gating to block supply of power to the first core 521. That is, to reduce power consumption, the first core 521 may block supply of power to itself.

Unlike the embodiment depicted in FIG. 4, the electronic device of the present disclosure may cause the first core to transition to the idle state other than the offline state and, when the first core remains in the idle state for a preset time, cause the first core to transition to the power save state. In other words, in an example embodiment of the present disclosure, the electronic device may cause the first core 521 to transition to power save mode other than the offline state.

Compared with the embodiment depicted in FIG. 4 requiring memory cleanup and variable cleanup, the electronic device of the present disclosure may have a shorter latency time as it does not have to perform such cleanup operations.

This is because memory cleanup and variable cleanup accompanied by transitioning the first core to the offline state may require a long latency time.

In the electronic device of the present disclosure, the power consumed when the first core remains in the power save state may be comparable to that when the first core remains in the offline state. Hence, the electronic device may consume less power compared with the case where the electronic device is operated according to the embodiment described in FIG. 4.

Hereinabove, a description is given of transitioning the first core 521 to the power save state in response to a restriction signal. Next, a description is given of transitioning the first core 521 to the online state in response to an online-state transition request signal.

In response to a restriction lift signal for lifting restrictions on the usage of the processor, the first core 521 or second core 522 may change the affinity of a process so that the process can be assigned to the first core 521.

The first core 521 may control reception of an interrupt request signal by use of a flag indicating interrupt acceptance. For example, the first core 521 may receive an IPI call by use of a flag indicating IPI call acceptance. The first core 521 may receive a SMP call by use of a flag indicating SMP call acceptance. The first core 521 may receive an IPI call and a SMP call by use of such flags.

After performing the above operations, the first core 521 may enter the online state.

Figure 6:
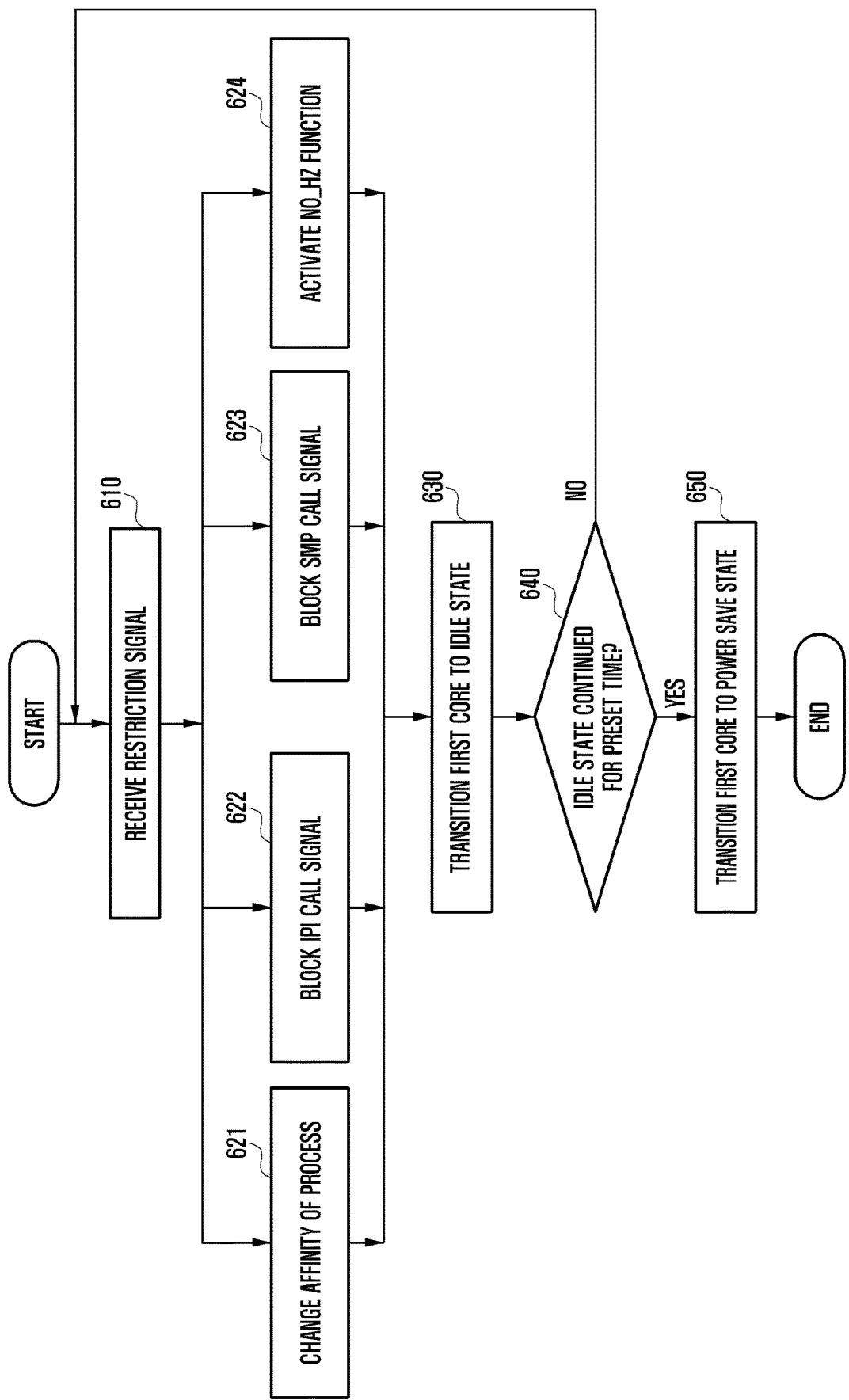
FIG. 6 is a flowchart illustrating an example method for operating the electronic device according to an example embodiment of the present disclosure.

FIG. 6 is a flowchart illustrating an example method for operating the electronic device according to an example embodiment of the present disclosure.

Referring to FIG. 6, at step 610, the processor 520 may receive a restriction signal destined for the first core 521. In response to the restriction signal, the first core 521 may perform one or more operations so as to remain in the idle state.

For example, at step 621, the first core 521 or the second core 522 may change the affinity of a process so that the process is not assigned to the first core 521.

As another example, at step 622, the first core 521 may block reception of an IPI call signal so as to remain in the idle state. At step 623, the first core 521 may block reception of a SMP call signal so as to remain in the idle state.

As another example, at step 624, the first core 521 may stop the associated timer and activate the NO_HZ function so as to remain in the idle state for an extended time.

Here, one or more of steps 621 to 624 may be executed in sequence or in parallel.

Thereafter, at step 630, the first core 521 may enter the idle state.

At step 640, the first core 521 determines whether it remains in the idle state for a given time. Upon determining that it remains in the idle state for the given time, at step 650, the first core 521 may enter the power save state.

Next, a description is given of differences between the comparative embodiment described in FIG. 4 and the example embodiment of the present disclosure described in FIGS. 5 and 6.

FIG. 7 is a diagram illustrating example cores with workloads for hot-unplugging operation in the electronic device according to an example embodiment of the present disclosure.

In FIG. 7, workloads of the individual cores are illustrated for the comparative embodiment described in FIG. 4 and the example embodiment described in FIG. 6.

In the case of the comparative embodiment described in FIG. 4, as the first core may be transitioned to the offline state, the first core may experience no workload as indicated by indicia 711.

In the case of the example embodiment described in FIG. 6, as the first core may be transitioned to the power save state, the first core may experience a very light workload as indicated by indicia 712.

That is, the operation method of the present disclosure causes the first core of the electronic device to transition to the power save state other than the offline state without requiring memory cleanup and variable cleanup, shortening the latency time for state transition.

Figure 8A:
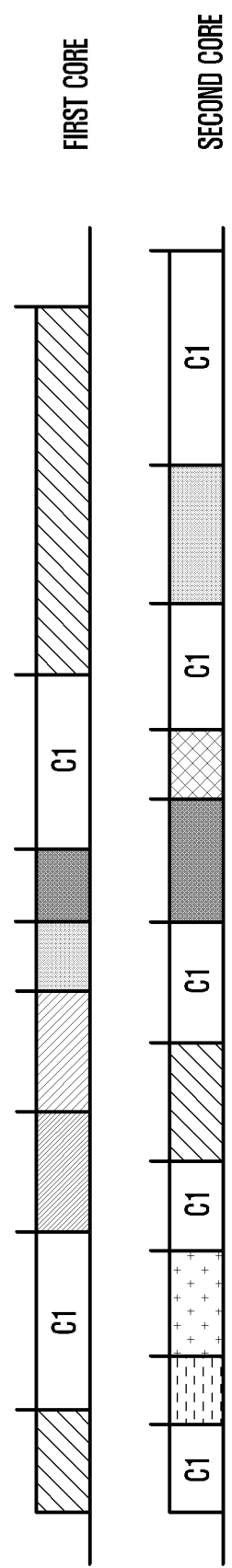
FIG. 8A is a diagram illustrating example power states of the processor in the case of a comparative embodiment.
Figure 8B:
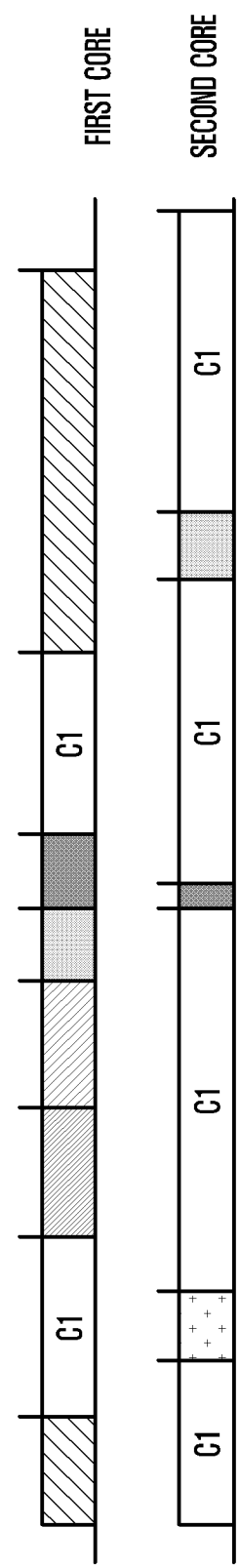
FIG. 8B is a diagram illustrating example power states of the processor in the case of an example embodiment using the method of the present disclosure.

FIG. 8A is a diagram illustrating power states of the processor in the case of the comparative embodiment described in FIG. 4. FIG. 8B is a diagram illustrating example power states of the processor in the case of the example embodiment using the method of the present disclosure.

In FIGS. 8A and 8B, "C1" indicates a processor state defined in the Advanced Configuration and Power Interface (ACPI) specification. The C1 state may correspond to the idle state. In the C1 state, the core is not executing instructions, but can return to an executing state instantaneously if necessary.

For the comparative embodiment, FIG. 8A depicts operations of the first core when executing instructions and operations of the second core when entering the plug out state.

Similarly, FIG. 8B depicts operations of the first core when executing instructions and operations of the second core when using the operation method of the present disclosure.

Compared with the hot-plug out case illustrated in FIG. 8A, it can be seen that the processor remains in the C1 state for a longer time in the case illustrated in FIG. 8B where the operation method of the present disclosure is used. Hence, it can be seen that the electronic device consumes less power when using the method of the present disclosure in comparison to the comparative embodiment described in FIG. 4.

FIG. 9 is a graph illustrating a result of comparison in terms of latency time between the comparative embodiment (shown in FIG. 4) using hot-plugging/unplugging and an embodiment using the method of the present disclosure.

For comparison, the electronic device was booted and operated normally for five minutes. Then, the latency time was measured while infinite-loop threads were being executed.

For the comparative embodiment illustrated in FIG. 4, the latency time for the hot-plug in operation (indicated by indicia 910) may refer to the time duration from reception of a hot-plug in command to issuance of a power-off command to the core.

For the comparative embodiment illustrated in FIG. 4, the latency time for the hot-plug out operation (indicated by indicia 920) may refer to the time duration from the time a hot-plug out command is received to the time the core is recognized as being in the online state.

For the example embodiment using the method of the present disclosure, the latency time for causing the core to transition to the online state (indicated by indicia 930) may refer to the time duration from the time a processor-usage restriction lift command is received to the time the core is recognized as being in the online state.

For the example embodiment using the method of the present disclosure, the latency time for causing the core to transition to the power save state (indicated by indicia 940) may refer to the time duration from the time a processor-usage restriction command is received to the time the core enters the power save state.

Referring to FIG. 9, it can be seen that, when the number of infinite-loop threads is less than 20, the latency time 910 for the hot-plug in operation in the comparative embodiment illustrated in FIG. 4 is comparable to the latency time 930 for causing the core to transition to the online state in the embodiment using the method of the present disclosure. However, it can be seen that, when the number of infinite-loop threads becomes greater than or equal to 20, the latency time 910 is significantly longer than the latency time 930.

With the increasing number of infinite-loop threads, the latency time 910 for the comparative embodiment increases. This is because the time required to handle thread variables tends to increase with the increasing number of infinite-loop threads. On the other hand, in the example embodiment using the method of the present disclosure, as the core transitions from the power save state to the online state, there may be no need to spend time handling thread variables. Hence, as an advantageous effect, the latency time 930 for causing the core to transition to the online state may remain constant with the increasing number of infinite-loop threads.

Additionally, it can be seen that, when the number of infinite-loop threads is less than 20, the latency time 920 for the hot-plug out operation in the comparative embodiment illustrated in FIG. 4 is comparable to the latency time 940 for causing the core to transition to the power save state in the embodiment using the method of the present disclosure. However, it can be seen that, when the number of infinite-loop threads becomes greater than or equal to 20, the latency time 920 is significantly longer than the latency time 940.

With the increasing number of infinite-loop threads, the latency time 920 for the comparative embodiment increases. This is because transitioning the core to the offline state entails memory cleanup and thread variable cleanup. The time required to perform memory cleanup and thread variable cleanup tends to increase with the increasing number of infinite-loop threads. Thus, the latency time 920 remains constant when the number of infinite-loop threads is small, and increases when the number of infinite-loop threads becomes greater than a specific value.

On the other hand, in the example embodiment using the method of the present disclosure, as the core transitions to the idle state first and then transitions to the power save state, there may be no need to spend time performing memory cleanup and thread variable cleanup. Hence, as an advantageous effect, the latency time 940 for causing the core to transition to the power save state may remain constant with the increasing number of infinite-loop threads.

Figure 10:
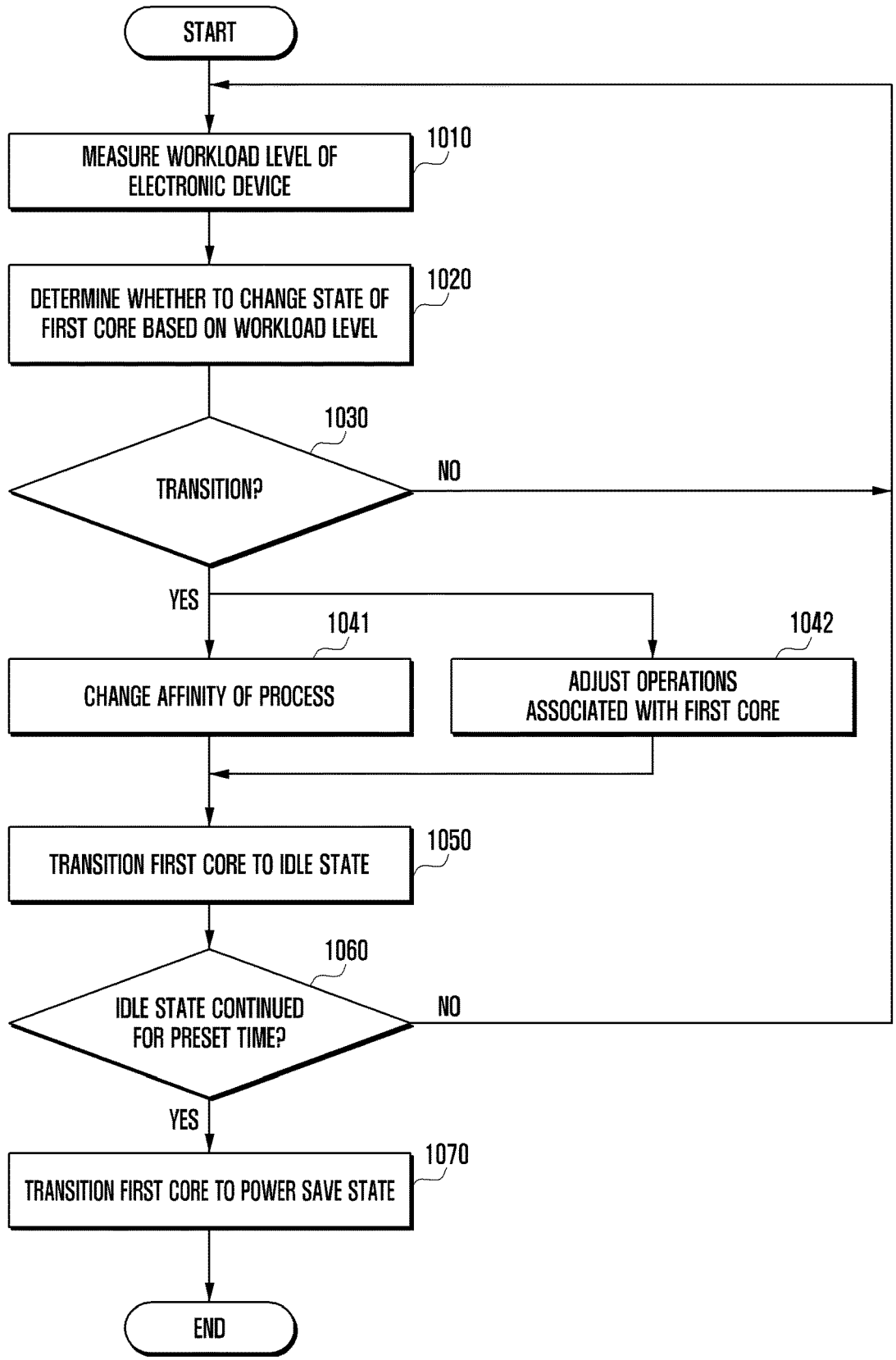
FIG. 10 is a flowchart illustrating an example method for operating the electronic device according to another example embodiment of the present disclosure.

FIG. 10 is a flowchart illustrating an example method for operating the electronic device according to another example embodiment of the present disclosure.

Referring to FIG. 10, at step 1010, the electronic device may measure the workload level. At step 1020, the electronic device may determine whether to change the state of the first core on the basis of the workload level.

For example, if the workload level is below a preset threshold, the electronic device may cause the first core among active cores to transition to the power save state.

To transition to the idle state before transitioning to the power save state, the first core may perform one or more of the following operations.

Upon determining to change the state of the first core at step 1030, at step 1041, the first core or the second core may change the affinity of a process.

At step 1042, the first core may adjust operations associated with the first core.

As described in FIG. 5, the operations associated with the first core may include blocking an interrupt request signal and stopping a timer inside the first core.

After removing a factor hindering the first core from remaining in the idle state (step 1041 and step 1042), at step 1050, the first core may transition to the idle state.

At step 1060, the first core checks whether it remains in the idle state for a preset time. If it remains in the idle state for a preset time, at step 1070, the first core may transition to the power save state.

Although not illustrated in FIG. 10, when an activation request signal for the first core is received after step 1070, the first core or the second core may change the affinity of a process so that the process can be assigned to the first core.

The above-discussed method is described herein with reference to flowchart illustrations, methods, and computer program products according to example embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Certain example aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various example embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various example embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device capable of placing restrictions on processor usage, comprising:
   a memory; and
   a processor comprising a first core and a second core,
   wherein the memory includes stored instructions that, when executed by the processor cause:
      control the first core to transit from an online state to an idle state in response to a restriction signal for the first core, wherein the idle state is a state in which power lower than power supplied in the online state is supplied to the first core,
      control the first core to transit to a power save state when the first core remains in the idle state for at least a preset time, wherein the power save state is a state in which power lower than power supplied in the idle state is supplied to the first core,
      cause the first core to perform blocking an interrupt request signal sent to the first core enabling the first core to continuously remain in the idle state, and
      wherein the interrupt request signal comprises the interrupt request signal sent by the second core to all cores including the first core.

2. The electronic device of claim 1, wherein the restriction signal corresponds to a restriction request signal generated by an application running on the first core or sent by the second core.

3. The electronic device of claim 1, wherein the memory further stores instructions that, when executed by the processor, cause the first core to perform at least one operation enabling the first core to continuously remain in the idle state.

4. The electronic device of claim 3, wherein the at least one operation includes blocking assignment of a process to the first core.

5. The electronic device of claim 4, wherein blocking assignment of a process to the first core includes changing an affinity of the process so that the process is not assigned to the first core.

6. The electronic device of claim 1, wherein the interrupt request signal comprises the interrupt request signal sent by the second core to the first core.

7. The electronic device of claim 3, wherein the at least one operation includes stopping a timer associated with the first core.

8. The electronic device of claim 1, wherein the memory further stores instructions that, when executed by the processor, change an affinity of a process in response to a restriction lift signal.

9. The electronic device of claim 1, wherein the memory further stores instructions that, when executed by the processor, apply clock gating to the first core and apply power gating to the first core upon expiration of the preset time after clock gating.

10. A method of operating an electronic device capable of placing restrictions on the usage of a processor including a first core and a second core, the method comprising:
   causing the first core to transition from an online state to an idle state in response to a restriction signal for the first core, wherein the idle state is a state in which power lower than power supplied in the online state is supplied to the first core;
   causing the first core to transition to a power save state when the first core remains in the idle state for at least a preset time, wherein the power save state is a state in which power lower than power supplied in the idle state is supplied to the first core,
   causing the first core to perform blocking an interrupt request signal sent to the first core enabling the first core to continuously remain in the idle state, and
   wherein the interrupt request signal comprises the interrupt request signal sent by the second core to all cores including the first core.

11. The method of claim 10, wherein the restriction signal corresponds to a restriction request signal generated by an application running on the first core or sent by the second core.

12. The method of claim 10, further comprising performing at least one operation enabling the first core to continuously remain in the idle state.

13. The method of claim 12, wherein performing at least one operation comprises blocking assignment of a process to the first core.

14. The method of claim 13, wherein blocking assignment of a process to the first core comprises changing an affinity of the process so that the process is not assigned to the first core.

15. The method of claim 14, wherein the interrupt request signal comprises the interrupt request signal sent by the second core to the first core.

16. The method of claim 12, wherein performing at least one operation comprises stopping a timer associated with the first core.

17. The method of claim 10, further comprising:
receiving, by the processor, a restriction lift signal for lifting restrictions on processor usage; and
changing an affinity of a process.

\* \* \* \* \*